Patented Sept. 3, 1946

2,406,795

UNITED STATES PATENT OFFICE 2,406,795

LITHOGRAPHIC PRINTING INK

Dominic J. Bernardi and Robert T. Florence, Bronx, N. Y., assignors to Interchemical Corporation, New York, N. Y., a corporation of Ohio No Drawing. Application June 25, 1943, Serial No. 492,310

2 Claims. (Cl. 106—29)

This invention relates to printing inks particularly designed for lithographic printing, and is particularly directed to the provision of a vehicle for lithographic printing inks in which the "greasing" or "scumming" phenomenon is much reduced.

In the lithographic printing process, a plate is prepared in which the printing areas and non-printing areas are substantially in the same plane, but are differentiated by the fact that the printing areas are grease-attractive and water-repellant, while the non-printing areas are water-attractive and grease-repellant. The plate, after preparation, has ink deposited in the inking areas; at this function, the plate is wet by water, which is accepted by the non-printing areas and rejected by the printing areas. It is then inked, and the impression in water and ink is transferred to an offset blanket from which it is transferred to the product to be printed. The cycle of wetting with water and ink is then repeated.

One of the great difficulties in the use of lithographic inks is the "greasing" phenomenon; this occurs to a greater extent with some pigments than with others, and is a partial wetting of the non-printing areas with ink. Obviously, this gives a greasy appearing print—hence the term "greasing" (sometimes called "scumming"). The art has always been interested in obtaining materials which will reduce the greasing.

We have discovered that excellent inks which show a minimum tendency toward greasing can be prepared most economically by using the pentaerythritol ester of tall oil as the principal vehicle of a lithographic ink. It may be used as the sole non-volatile ingredient; although the ester is somewhat too viscous to be used in pure form, it can be reduced with a solvent having the necessary volatility characteristics. Most preferably, it is reduced to a desirable lithographing body by admixture with a relatively minor percentage of another drying oil.

The ester can be made in conventional fashion by heating the tall oil and pentaerythritol together, preferably with a catalyst. This can be done, for example, by taking the theoretical equivalent quantities of the two materials (9% of pentaerythritol and 91% of tall oil), and esterifying them at a temperature ranging from 200 to 250° C., using 1% of CaO as a catalyst. Carbon dioxide is bubbled through the oil to prevent oxidation and to carry off the water of esterification. The resultant ester has an acid number of about 10, and a viscosity which depends upon the source of the tall oil, and upon the resulting compositions. We have obtained viscosities varying from a minimum 29 poises at 30° C., (for a tall oil containing 55–60% fatty acids) to about 1500 poises at 30° C., for a tall oil containing 50% fatty acids. The thinnest ester can be used alone; the thicker esters are mixed with linseed oil to get the desired body. A mixture of about 4 parts of ester with a viscosity of 120 poises (obtained above from a tall oil containing 53% fatty acids, 39% resin acids and 7% unsaponifiable), and 1 part of a drying oil such as linseed or Perilla oil, gives a desirable body for a lithographic varnish. A similar varnish can be obtained by mixing drying oil acids with the tall oil before esterification.

Typical examples of inks made following our invention are the following:

Example 1.—Peacock blue

| | Parts by weight |
|---|---|
| Peacock blue | 40 |
| Cobalt drier (3.5% cobalt) | 5 |
| Varnish A | 55 |

Example 2.—Iron blue

| | Parts by weight |
|---|---|
| Bronze blue | 40 |
| Paste drier | 1 |
| Varnish A | 59 |

Example 3.—Red

| | Parts by weight |
|---|---|
| Barium lithol toner | 35 |
| Cobalt drier of Example 1 | 5 |
| Varnish A | 60 |

Example 4.—Yellow

| | Parts by weight |
|---|---|
| Chrome yellow | 65 |
| Paste drier of Example 2 | 3 |
| Varnish A | 32 |

Varnish A, referred to in the above examples, is the mixture of 80% pentaerythritol tall oil ester (viscosity 120 poises), and 20% of refined linseed oil, described above.

The above formulas were compared with similar formulas made with linseed oil bodied to the same body as the varnish above identified.

The linseed oil dried somewhat faster than our new oil with Peacock blue, and dried at about the same rate in the yellow and red formulas, but our oil dried considerably faster in the iron blue formulation, and dried faster in blacks. The faster drying in the case of the Peacock blue formulation can be explained by the fact that the Peacock blue ink in linseed oil bodied up considerably on standing for three days at a slightly elevated temperature, while the change in the case of the pentaerythritol tall oil ester vehicle was much less.

The greatest advantages of our new formulations were observable when printing trials were run. Very much less greasing or scumming occurred with our inks than with similar inks containing only bodied linseed oil.

Obviously, the above formulations are merely typical, and can be widely varied, in a manner known to those skilled in the art, to get various colors and effects.

We claim:

1. A lithographic printing ink which shows considerably reduced greasing as compared to a similar ink made with bodied linseed oil, comprising pigment dispersed in a vehicle, the essential basis of which is the ester of pentaerythritol and tall oil, the ratio of ingredients being such that the composition has the typical stiff body of lithographic printing inks.

2. A lithographic printing ink which shows considerably reduced greasing as compared to a similar ink made with bodied linseed oil, comprising pigment dispersed in a vehicle, the essential basis of which is the ester of pentaerythritol and tall oil, in combination with sufficient drying oil to approximate the body of conventional lithographic varnish, the ratio of ingredients being such that the composition has the typical stiff body of lithographic printing inks.

DOMINIC J. BERNARDI.
ROBERT T. FLORENCE.